APPARATUS AND METHOD FOR ELECTRIC RECORDING

Filed Oct. 11, 1962 2 Sheets-Sheet 1

INVENTOR.
ROBERT V. MAZZA
BY Richard H. Smith
AGENT

Nov. 8, 1966 R. V. MAZZA 3,284,196

APPARATUS AND METHOD FOR ELECTRIC RECORDING

Filed Oct. 11, 1962 2 Sheets-Sheet 2

United States Patent Office 3,284,196
Patented Nov. 8, 1966

3,284,196

APPARATUS AND METHOD FOR ELECTRIC RECORDING

Robert V. Mazza, Poughkeepsie, N.Y., assignor to International Business Machines Corporation, New York, N.Y., a corporation of New York Filed Oct. 11, 1962, Ser. No. 229,892
2 Claims. (Cl. 96—1.1)

Figure 1A:
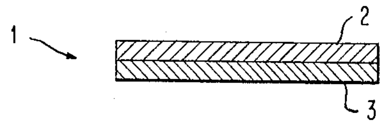

This invention relates to an apparatus and method for electric recording, and, more particularly, to an electric recording scheme wherein information is recorded in the form of a ripple pattern on the surface of a thermoplastic record medium.

The art of thermoplastic recording is described in an article entitled, "Thermoplastic Recording," appearing in the Journal of Applied Physics for December 1959 (vol. 30, No. 12), at page 1870. As described in that article, the process of recording an image on a thermoplastic record medium includes: (1) depositing on the surface of the medium a pattern of electric charge representative of an image to be recorded; (2) transporting the medium to a heating station; (3) applying heat to the medium in order to melt its surface, allowing electrostatic forces accompanying the charge pattern to form a ripple pattern corresponding to the charge pattern on the fluid surface of the medium; and (4) cooling the medium in order to permanently set the ripple pattern into its surface. A suitable optical system, as described in the article, may then be used to observe the recorded image. Erasure of the ripple pattern is effected by melting the surface of the record medium and allowing surface tension to restore the fluid surface to a smooth condition.

The temperature at which electrostatic deformation of a thermoplastic record medium takes place is hereinafter referred to as the "deformation temperature" of the thermoplastic. Of course, different thermoplastics have different deformation temperatures, but in general temperatures ranging around 100° C. have been found to be suitable deformation temperatures for thermoplastics presently in use. The word "fluid" as herein used to describe the state of a thermoplastic when heated to its deformation temperature is taken to mean that the thermoplastic is capable of being easily deformed by slight pressures, yet is viscous enough to refrain from running or dripping.

It will be observed that the recording technique above described requires an actual transfer of electric charge onto the recording medium itself. One method of accomplishing this charge transfer has been to divert the electron beam of a cathode ray tube onto the surface of the thermoplastic record medium, distributing electrons in desired amounts on the surface of the medium in order to create an image-bearing charge pattern. With such a scheme it is necessary that at least the electron deposition step be carried out in a vacuum. This necessity for operating in a vacuum requires additional expensive equipment and renders certain portions of the recording mechanism inaccessible, generally complicating the process and increasing its cost.

Further, the charge pattern deposited on the surface of the record medium in the above described process tends to remain intact for long periods of time. This means that if the record medium is to be erased and re-used, the charge pattern must be dissipated. Such charge dissipation has usually been carried out during the erasing process by heating the record medium to a temperature where its resistivity decreases enough to permit relatively rapid decay of the charge pattern. For most thermoplastics suitable for use as a record medium, this erasure temperature is a good deal higher than the deformation temperature, thus requiring high erasing temperatures. This results in an undesirable reduction in the number of times that a record medium may be reused.

It is therefore an object of the present invention to provide an apparatus and method for electric recording wherein no electric charge is transferred to the record medium.

A further object is to provide an apparatus and method for electric recording wherein the record medium carries no residual charge.

Another object is to provide an apparatus and method for recording on a thermoplastic record medium without placing a charge pattern on the record medium.

Still a further object is to provide an apparatus and method for recording on a thermoplastic record medium without the use of a vacuum.

Still another object is to provide an apparatus and method for recording on a thermoplastic record medium in which erasure of a recorded image may be effected by heating the record medium not appreciably above its deformation temperature.

In accordance with the present invention, a ripple pattern is impressed upon the surface of a deformable record medium by electrostatic forces generated by an information-modulated electric field. The electric field is set up and modulated without the use of the record medium as a charge carrying body, and the record medium is acted upon by electrostatic forces as previously described while being insulated from an electric charge transfer. Such chargeless recording results in a process which can be carried out in air. Further, the thermoplastic record medium carries no residual charge after being developed and is thus erasable at temperature equal to or just slightly above its deformation temperature.

The foregoing and other objects, features and advantages of the invention will be apparent from the following more particular description of preferred embodiments of the invention, as illustrated in the accompanying drawings.

Figure 1B:
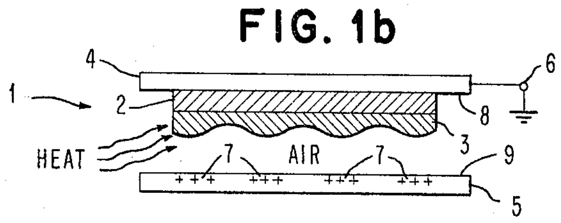
Figure 1C:
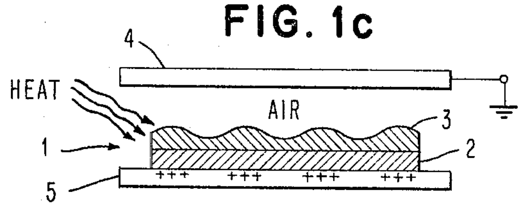

In the drawings:

FIGS. 1*a*, 1*b*, and 1*c* are schematic diagrams illustratinng the basic principles of the present invention.

Figure 2:
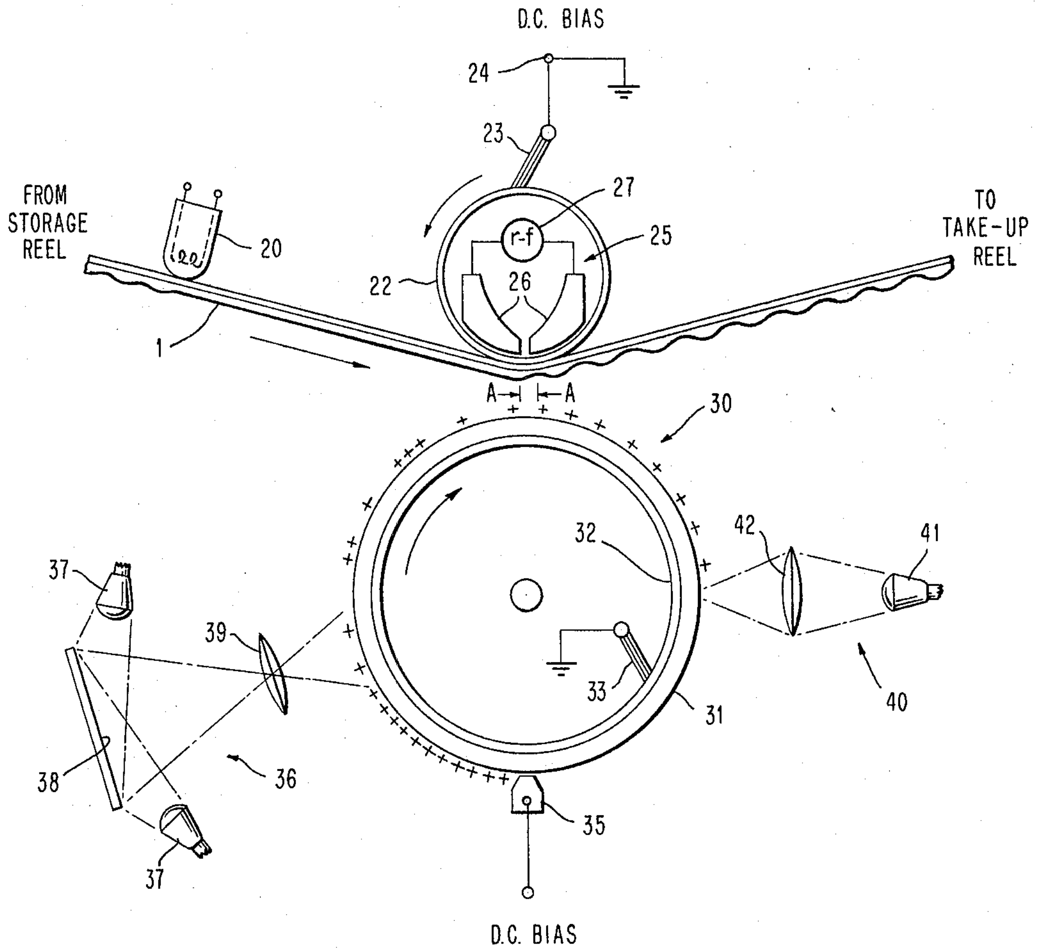

FIG. 2 schematically represents a first preferred embodiment of the present invention.

Figure 3:
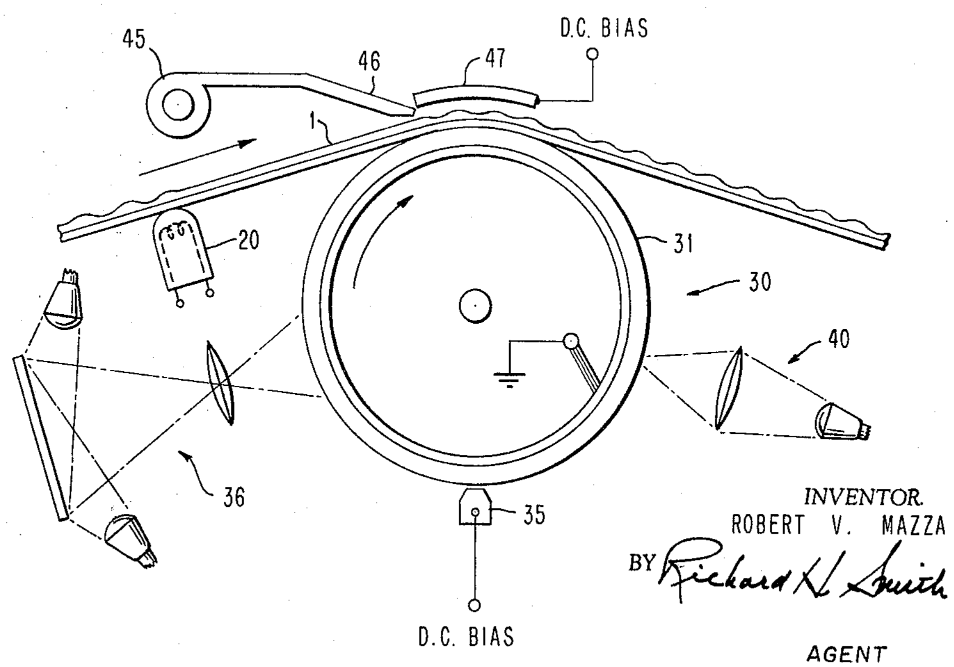

FIG. 3 schematically represents a second preferred embodiment of the present invention.

Shown in FIG. 1*a* is a cross-section of a two layer plastic web 1 which is a preferred form of record medium for use with the recording scheme of the present invention. The top layer 2 is made of a high melting point plastic material which serves to support a layer 3 of a relatively low melting point thermoplastic material. As will be subsequently described, this record medium can be heated to the deformation temperature of layer 3, rendering that layer fluid, without materially affecting the layer 2. As previously stated, when the layer 3 is in a fluid state it is capable of being easily deformed by slight pressures, yet is viscous enough to refrain from running or dripping and is adherent enough to keep its position on support layer 2.

FIG. 1*b* shows the record medium 1 positioned between a grounded electrode 4 and a flat member 5 carrying on its surface a pattern of electric charge 7. The charge pattern 7 is commonly referred to as an electrostatic latent image and comprises a grouping of areas having varied electrostatic charge densities. Electrostatic latent image 7 may be made, in a manner more fully described in connection with FIG. 2, to represent any sensible image, such as a photograph, a printed document, etc. Since the member 5 is electrically charged and the electrode 4 is at ground potential (uncharged), a voltage gradient and thus an electric field exists between the member 5 and electrode 4 as between the plates of a charged capacitor. It is readily apparent that the electric field will exist at right angles to the surfaces 8 and 9. Further, the field exhibits a flux density which varies in direct proportion to the electrostatic charge density on the surface 9 of member 5.

It is known that when two materials having different dielectric constants are sandwiched together and subjected to an electric field, electrostatic forces will be developed at the interface between the two materials. If the interface is situated at right angles to the field, the force exerted on any portion of the interface is perpendicular thereto and proportional to the flux density of the electric field cutting that portion of the interface. Thus, when the record medium 1 is suspended as shown in FIG. 1*b* an electrostatic force field is developed over the lower surface of the record medium and varies in intensity over that surface as the electrostatic latent image 7 varies in charge density over the surface of the member 5. By heating the record member to the deformation temperature of thermoplastic layer 3, a ripple pattern is formed in its lower surface, as indicated in FIG. 1*b*. This ripple pattern is an accurate manifestation of the electrostatic latent image 7 and becomes a permanent part of the record member when the heat is removed and thermoplastic layer 3 is allowed to resolidify either while still in the presentce of the electric field or shortly after having been removed therefrom.

Re-solidification of the thermoplastic should, from the standpoint of absolute accuracy of reproduction, be carried out while the record medium is still under the direct influence of the electric field. However, as is the case with the continuous processes illustrated in FIGS. 2 and 3, to be described later, this ideal condition can be relaxed to a degree without affecting fidelity of reproduction to any great extent. It is apparent that because of the rather high viscosity of the fluid thermoplastic, some time period must elapse before a ripple pattern in the surface of the thermoplastic can be completely leveled—absent an electrostatic force field—by surface tension. The higher the viscosity, the longer this time period. Therefore, the record medium may be removed from the electric field before it is re-solidified (cooled) and can still be made to record an accurate image manifestation as long as re-solidification takes place before surface tension has dissipated the ripple pattern to any appreciable extent.

The air gap shown in FIG. 1*b* serves two important purposes. First, since the air is of a different dielectric constant than is the record member, electrostatic forces will develop at the surface of the record member. Second, the air gap serves as a layer of insulation which prevents any electric charge from being transferred to the record medium. As a result, if no charge exists on the record medium before the recording operation, no charge will exist on it after the recording operation. It is to be understood, of course, that a certain amount of static charge will accumulate on the record medium as it moves in contact with the various guide means employed in the recording apparatus, such as reels, etc. This creates a low level background "noise" on the record medium which in no way impairs the operation of the present invention. Thus for the purposes of this invention the record medium remains "uncharged" as long as there is no transfer to the medium of a charge pattern representing an image to be recorded.

In theory and in practice it has been found that instead of connecting ground potential to terminal 6 of electrode 4 better results are achieved when a D.C. bias of approximately 500 volts is applied thereto. With this much of a potential gradient, an air gap of several tenthousandths of an inch must be provided in order to prevent an undesirable electrical discharge to the record member. A preferred material for the member 5 is selenium which, because of its photoconductive properties, may have impressed on its surface an electrostatic latent image of suitable resolution. Heat is applied to the record member by means subsequently to be described in connection with FIGS. 2 and 3.

FIG. 1*c* illustrates a modification of the recording scheme of the present invention as described above. The difference to be noted is that the embodiment of FIG. 1*c* has the record medium inverted and in contact with the member 5 rather than the electrode 4. The operation of this embodiment and the final results obtained are the same as have been previously described for the embodiment of FIG. 1*b*.

FIG. 2 illustrates, in schematic form, a continuous recording device operating upon the principles previously discussed in connection with FIG. 1*b*. The record medium 1, in strip form, plays from left to right beneath a conductive roller 22. Roller 22 corresponds to the electrode 4 of FIG. 1*b* and is connected to a source of D.C. potential via a contact brush 23 and a terminal 24. An R.-F. heater 25 comprising a generator 27 and a pair of pole pieces 26 is mounted inside of roller 22 and provides a source of heat for the recording operation. A filament heater 20 may be inserted to the left of roller 22 for the purpose of erasing any images which may have been previously recorded on the record medium.

Since the recording process is culminated in the relatively short space represented between the lines A—A, it is important that there be no relative movement between roller 22, record medium 1 and drum 30 (to be subsequently described) at this point. The speeds of these three members must be suitably adjusted to this end. The drum 30 corresponds to the member 5 of FIG. 1*b* and, as previously discussed, is the body on which an electrostatic latent image to be recorded is developed. The development of this image on the surface of the drum is accomplished in a standard fashion and is schematically depicted in the lower portion of FIG. 2. The outer surface 31 of the drum 30 is made of a photoconductive material such as selenium, as mentioned above. The inner portion 32 of the drum 30 represents a cylinder of material which should be both rigid to provide adequate support for photoconductive layer 31 and conductive to provide an electrical path between that layer and ground (via contact brush 33).

Stationed about the circumference of the drum are a charging device 35, projection means 36 and a discharging device 40. These three elements coact in a well-known manner with the rotating drum 30 to provide the recording station at A—A with a continuous succession of electrostatic latent images to be recorded on the record medium 1 as it moves from left to right. The charging device 35 may be a corona discharge electrode and functions to deposit an even layer of charge over the surface of the drum. The D.C. bias connected to the electrode 35 is preferably on the order of 6,000–7,000 volts, and, when selenium is used for the outer surface 31 of the drum, should be of a suitable polarity to effect the deposition of a positive charge layer on the drum surface.

An electrostatic latent image is created on the surface of the drum as the drum rotates past projection station 36. This station comprises support means 38 for positioning a document (or other image to be recorded) in a suitable position, illumination sources 37, and a lens system 39. Light reflected from the document is cast upon the photoconductive surface of the drum, dispersing, at selected portions of that surface, the previously deposited charge, creating an electrostatic latent image. This image is then transported by the drum to the station A—A and is there transferred, in the form of a ripple pattern, onto the surface of record medium 1. The mechanics of this transfer have been previously discussed in connection with FIG. 1*b*. The image on the drum is then rotated past discharge station 40 which includes a light source 41 and a lens 42. These two elements coact to cast a constant intensity beam of light across the entire width of the drum, thus dispersing the electrostatic latent image and preparing the drum for receiving a new image on its next revolution.

While it has been previously stated that the two layer record medium depicted in cross-section in FIG. 1*a* is a preferred form of record medium for use with the present invention, some modification of the structure shown in FIG. 1*a* may be desirable insofar as its use with the particular apparatus shown in FIG. 2 is concerned. This modification involves interposing a thin layer of electrically conductive material between the layers 2 and 3 shown in FIG. 1*a*. When this is done the D.C. bias shown in FIG. 2 as being connected to terminal 24 can be connected instead to the layer of conductive material in the record medium and the roller 22 and contact brush 23 can be eliminated.

Such a construction is desirable because it does away with variations which occur in the spacing between the recording surface of the record medium and the electrode 22 (FIG. 2) as the medium is reeled past the recording area A—A. These spacing irregularities are caused by variation in the reeling tension of the record medium. A D.C. bias can be applied to the conductive layer of the record medium through either the storage reel or the take-up reel of the recording apparatus or through a capacitive arrangement.

FIG. 3 illustrates a modified form of continuous recording device base upon the embodiment of the present invention described in connection with FIG. 1*c*. Electrode 47 of FIG. 3 corresponds to electrode 4 of FIG. 1*c* and the photoconductive layer 31 of the drum 30 of FIG. 3 corresponds to the member 5 of FIG. 1*c*. The construction and operation of the drum assembly 30, discharge means 40, charge means 35, projection means 36, and the record medium erasing device 20 are exactly the same as previously shown and described in FIG. 2. It is to be noted, however, that FIG. 3 shows a blower 45 and a nozzle 46 for injecting a controlled stream of hot air into the gap between electrode 47 and record medium 1. The hot air serves both as a heating medium to raise the temperature of the thermoplastic portion of record medium 1 to its deformation temperature and as a means of varying the degree of electrical insulation offered by the air gap.

As is apparent from the two embodiments described, the recording process of the present invention can be carried out without use of a vacuum as an environment for any one of its stages, and does not require the transfer of an electric charge to the record medium. Such a scheme produces accurate recording at a low cost and extends the useful life of the record medium, as has been brought out in the early portion of this specification.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of recording an image on a thermoplastic record medium having a first surface and a second heat deformable surface comprising the steps of:

casting a light image on a pre-charged, electrically biased photoconductive surface to form an electrostatic latent image thereon;

raising the temperature of the second surface of said thermoplastic medium above its deformation temperature;

placing the first surface of said thermoplastic medium in contact with the photoconductive surface thereby inducing in the second surface a pattern of deformations representative of said electrostatic latent image; and lowering the temperature of said second surface below its deformation temperature thereby solidifying the thermoplastic surface and preserving the pattern of deformations representative of the electrostatic latent image.

2. The method of recording an image on a thermoplastic record medium having a first surface and a second heat deformable surface comprising the steps of:

casting a light image on a pre-charged, electrically biased photoconductive surface to form an electrostatic latent image thereon;

placing the first surface of said thermoplastic medium in contact with the photoconductive surface;

raising the temperature of the second surface of said thermoplastic medium above its deformation temperature thereby inducing in the second surface a pattern of deformations representative of said electrostatic latent image; and lowering the temperature of said second surface below its deformation temperature, thereby preserving in the second surface of said thermoplastic medium a pattern of deformations representative of said electrostatic latent image.

References Cited by the Examiner

UNITED STATES PATENTS

| | | | |
|---|---|---|---|
| 2,784,694 | 3/1957 | Crumrine et al. | 346—74 |
| 2,896,507 | 7/1959 | Mast et al. | 96—1 |
| 3,113,179 | 12/1963 | Glynn | 340—173 |
| 3,162,104 | 12/1964 | Medley | 340—173 |
| 3,196,013 | 7/1965 | Walkup | 347—74 |

TERRELL W. FEARS, *Acting Primary Examiner.*

IRVING SRAGOW, BERNARD KONICK, *Examiners.*

H. D. VOLK, J. BREIMAYER, *Assistant Examiners.*